Figure 1:
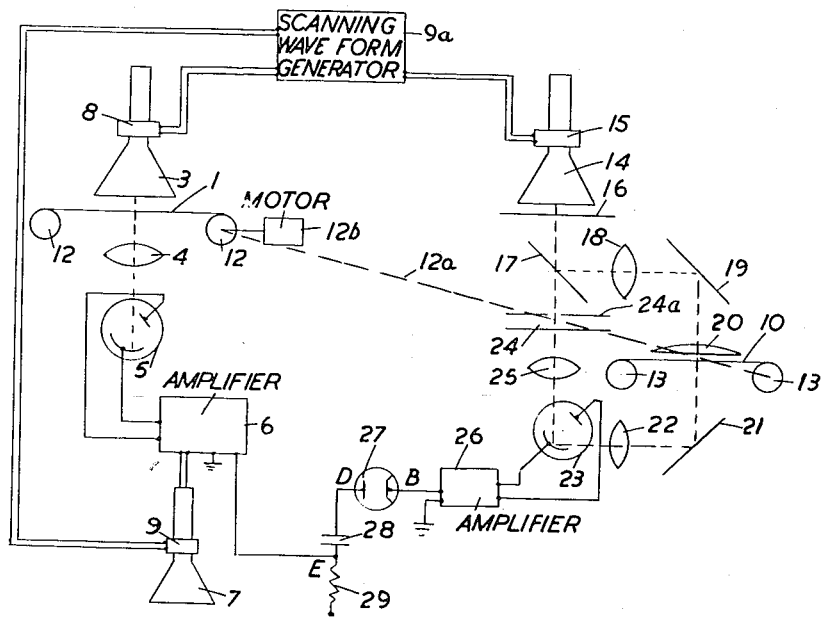

March 13, 1956  R. E. SPENCER  2,737,730
APPARATUS FOR GENERATING AND REPRODUCING ELECTRICAL SIGNALS
Filed Feb. 8, 1951

Inventor
ROLF EDMUND SPENCER
By Ralph E. Atherton
Attorney

United States Patent Office 2,737,730
Patented Mar. 13, 1956

2,737,730

APPARATUS FOR GENERATING AND REPRODUCING ELECTRICAL SIGNALS

Rolf Edmund Spencer, London, England, assignor to Electric & Musical Industries Limited, Hayes, England, a British company Application February 8, 1951, Serial No. 209,996

Claims priority, application Great Britain February 10, 1950

6 Claims. (Cl. 35—10.4)

This invention relates to apparatus for generating and reproducing electrical signals.

Airborne apparatus is known of the type which generates a signal which is radiated and in which echoes of the signal are received and reproduced on a suitable screen so that a plan is made of the terrain below the aircraft. In order to train aircraft crews in the use of such equipment, it is desirable to generate artificial signals and to reproduce such signals so that the trainee crews can observe the signals as though under actual flying conditions. One way of generating the artificial signals is to provide a three-dimensional representation of a terrain and to project an image of the representation on to a television camera. A three-dimensional representation is necessary since under flying conditions a prominence such as a hill in the line of a transmitted signal will prevent reflections from being obtained from objects obscured by the prominence. The use, however, of a three-dimensional representation is undesirable not only on account of the cost of production of such a representation but also on account of the size of the representation and the fact that in order to simulate relative movement between an aircraft and the representation, it would in general be necessary to cause the television camera to move relatively to the representation.

The main object of the present invention is to provide an improved apparatus for generating signals, representing singals obtained from apparatus of the type described in which the use of a three-dimensional representation for production of said signals is avoided.

According to the present invention, apparatus for generating and reproducing electrical signals representative of a terrain is provided comprising means for scanning a representation of a terrain so as to generate electrical signals, means for synchronously scanning a separate representation of a prominence on said terrain to generate control signals, means for reproducing the electrical signals representative of said terrain and means for preventing reproduction of said signals at appropriate times by said control signals.

Preferably the representation of said terrain is in the form of a transparency and said transparency is arranged to be scanned by a flying light spot scanner. The representation of prominences on said terrain is also preferably in the form of a transparency, with the prominences represented as dark areas and which is also arranged to be scanned by a flying light spot scanner. The representations of both the terrain and prominences may be in the form similar to cinematograph films and movement of an aircraft may be simulated by causing the films to move synchronously relatively to the scanning light spots. The use of separate representations of the terrain and prominences enables two-dimensional representations to be employed and the control signals which are generated from the representation of prominences serves to prevent reproduction of signals from the representation of the terrain should there be an intervening prominence which would normally prevent reflections from being obtained under actual flying conditions.

Figure 2:
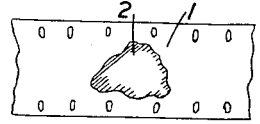
Figure 3:
Figure 4:
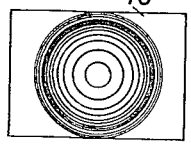
Figure 5:
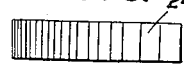
Figure 6:
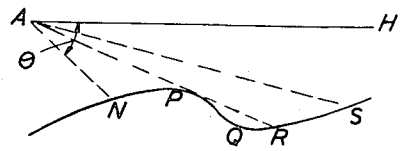
Figure 7:
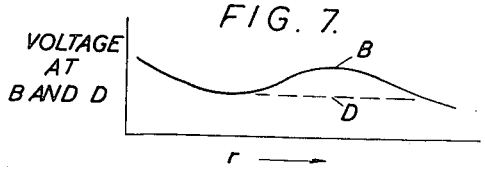
Figure 8:

In order that the said invention may be clearly understood and readily carried into effect, it will now be more fully described with reference to the accompanying drawings in which:

Figure 1 diagrammatically represents apparatus in accordance with the invention, Figure 2 is a diagram illustrating a transparency representing a terrain, Figure 3 is a diagram of a transparency representing a prominence on the terrain shown in Figure 2, Figure 4 is a diagram illustrating a range filter employed in the apparatus shown in Figure 1, Figure 5 is a diagram illustrating a light filter for use in the apparatus shown in Figure 1, and, Figures 6, 7 and 8 are explanatory diagrams.

The apparatus shown in Figure 1 is intended to be used for the generation and reproduction of artificial signals which simulate actual signals as received by apparatus of the type described for use in the ground training of aircraft crews in the use of such apparatus. The artificial signals are generated by scanning a transparency 1 (Figures 1 and 2) which transparency is similar to a cinematograph film and contains a representation of the outline of an actual map and which is indicated at 2 in Figure 2. The transparency 1 is arranged to be scanned in a radial manner following the customary operation of apparatus of the type described by a flying light spot which is generated by a cathode ray tube 3, which forms a flying light spot scanner similar to the flying light spot scanners employed for scanning cinematograph films for the generation of television signals. The light output from the cathode ray tube 3, after passing through the film 1, is projected by an optical system indicated at 4 on to a photo-electric cell 5, the output of which is fed into an amplifier 6 and then applied to a reproducing cathode ray tube 7, which serves to reproduce on the screen of the tube a picture representing the map 2. The cathode ray tubes 3 and 7 are scanned in synchronism with one another for which purpose the deflecting means for the beams of the tubes indicated at 8 and 9 respectively are fed with suitable scanning waveforms from a scanning waveform generator indicated at 9a which serves to generate waveforms suitable for deflecting the beams of said tubes in the radial manner well known in the radar art. It will be appreciated that it is desirable to be able to vary the artificial signals so generated in a manner such as would be obtained with varying heights of aircraft under actual flying conditions and it will be appreciated that in causing such signals to vary it is necessary to take into account the contour of the terrain from which the transparency is reproduced since obviously with varying heights of aircraft so the actual signals received under flying conditions will vary due to the effect of prominences in the line of the transmitted signals. In order to take into effect the occurrence of prominences in the path of transmitting signals, such as would be obtained under actual flying conditions, a further transparency 10 is employed having a representation 11 corresponding to the representation 2 but in which the contour of the terrain is represented by different degrees of transparency. This further transparency 10 will hereinafter be referred to as the "contour filter." Both the transparencies 1 and 10 may be carried by suitable sprocket wheels 12 and 13 (Figure 1) which are intercoupled as indicated by the dotted line 12a and driven by a motor 12b whereby the transparencies can be moved in synchronism with one another. The contour filter 10 is arranged to be scanned by a flying light spot scanner, the cathode ray tube 14 of which is indicated in Figure 1, the flying light spot of which also operates in synchronism with the flying light spots of the tubes 3 and 7, for which purpose the scanning means 15 of the tube 14 is also fed from the scanning waveform generator 9a. The contour filter serves to cause the generation of control signals which are employed to prevent the transmission of signals through the amplifier 6 so that no signals are reproduced on the cathode ray tube 7 when the terrain is such that no signals should be reproduced due to the intervention of a prominence. The contour of the terrain may be represented in such a manner that the highest points of the terrain are black with other heights graded in proportion to full transparency as indicated in Figure 3. The light spot generated by the cathode ray tube 14 is arranged to transmit the light so generated through a range filter 16 (Figures 1 and 4) which is so graded radially as to pass an amount of light which over an operating range is inversely proportional to the radius of scan of the light spot in the tube 14. The light passing the range filter 16 is then directed onto a half-silvered mirror 17 which reflects part of the light through a lens 18 on to a further mirror 19 where the light is reflected through a field lens 20 on to the contour filter 10. The contour filter is arranged to pass a fraction of the light falling on its proportional to the difference between a predetermined ground height and a reference height of say 7000 feet. The light transmitted through the contour filter then passes on to a further mirror 21 from which it is reflected and passed through a lens 22 on to a photo-electric cell 23. The light which passes through the half-silvered mirror 17 passes through a diaphagm 24a and then through another filter 24 (Figures 1 and 5) which over the range which is scanned at any instant is of approximately uniform density but which can be adjusted longitudinally in a manner representing different aircraft heights and is designed to have a transparency so as to transmit a fraction of light proportional to the adjusted aircraft height above the same reference height of say 7000 feet. The filter 24 is, therefore, a transparency graded longitudinally as indicated in Figure 5. The light passing through the filter 24 then passes through a lens 25 on to the aforesaid photo-electric cell 23. The total light reaching the photo-electric cell 23 is thus proportional to $$\frac{H-7,000}{r}+\frac{7,000-h}{r}$$

or $$\frac{H-h}{r}=\tan \theta \text{ or angle of depression}$$

where H and h are the aircraft and the ground heights, and r the instantaneous ground range.

To a close approximation this quantity and therefore the output from the photo-electric cell 23 is proportional to the angle of depression from the horizontal of the line joining the aircraft to the instantaneous target. The representation of the artificial signal is required to be blacked out when the angle of depression exceeds any value which it has already reached on the same radial scan. This blacking out of the representation is achieved by utilising the output of the photo-electric cell 23 to provide gating signals i. e. signals of pulse like form which prevent the transmission of signals through the amplifier 6 at appropriate times. The amplifier 6 may be of any suitable construction capable of being operated by gating signals and may be of the kind shown in the United States patent to Bedford No. 2,164,297. For this purpose the output of the photo-electric cell 23 is fed to an amplifier 26 the output of which is connected to the cathode of a unidirectionally conducting device 27 the anode of which is connected through a storage circuit comprising a condenser 28 and a resistance 29, to a point of suitable potential. Since the high spots on the contour filter 10 are represented by black areas it will be appreciated that assuming the contour which is being scanned represents a hill, then as the angle of depression is decreasing the output from the photo-electric cell 23 will likewise be decreasing. When the high spot is reached further scanning of the contour filter 10 will produce a signal which is increasing in intensity and during this period the artificial signals generated should not be reproduced on the cathode ray tube 7 since the contour which is then being scanned should be obscured by the high spot on the contour filter 10 which represents a prominence. Figure 6 diagrammatically illustrates a section of terrain and in this figure A indicates an aircraft, AH the horizontal and NPQRS a ground section such that the hill at P should obscure reflections from there to the point R. With the circuit above described, as the spot from the cathode ray tube 14 travels outwards on the contour filter 10 the voltage at the output of the amplifier i. e. at point B, is proportional to $\tan \theta$. At N, the voltage at B falls steadily as $\theta$ decreases and as the voltage falls current will flow through the unidirectionally conducting device 27 causing discharge of the condenser 28. So long as current flows a voltage will appear across the resistance 29 and the resulting voltage, i. e. voltage at point E, is amplified, reversed in sense and employed as a gating signal to control the amplifier 6. As soon as the high spot on the contour filter is passed by the scanning spot, such high spot corresponding to the hill P in Figure 6, the voltage at point B will increase, but as no current can then flow through the unidirectionally conducting device 27 no voltage will be generated across the resistance with the result that the amplifier associated with the artificial signal generator will prevent the transmission of the artificial signals. This condition remains from Q to R in Figure 6 until the voltage at point B again falls to that at D and over the range RS and onwards a voltage will be set up across the resistance 29 to permit the transmission of the artificial signals. The voltage set up at points B and D is shown in Figure 7 and the voltage at E is shown in Figure 8. At the commencement of each scan the condenser 28 must be charged to a value higher than the output of the photo-electric cell 23 can produce at the output of its associated amplifier 26 so that it can again operate in the manner above described.

Instead of employing two separate cathode ray tubes for generating light spots for scanning the map transparency and the contour filter, a single cathode ray tube may be employed with suitable optical arrangements for causing the spot generated by the cathode ray tube to scan both transparencies.

What I claim is:

1. Apparatus for generating and reproducing electrical signals representative of a terrain, comprising a representation of said terrain in the form of a transparency, a cathode ray tube for generating a light spot, means for radially scanning the beam of said tube to cause said light spot to scan said transparency radially, a separate representation in the form of a transparency of a prominence on said terrain, means for synchronously scanning said separate representation with a light spot, a range filter in the form of a transparency, means for synchronously scanning said range filter with a light spot, said range filter being graded to pass an amount of light inversely proportional to the radius of scan, means to generate control signals from signals derived from said separate representation and said range filter, means for reproducing electrical signals representative of said terrain, and means for preventing reproduction of said electrical signals at appropriate times by said control signals.

2. Apparatus for generating and reproducing electrical signals representative of a terrain, comprising means for scanning a representation of a terrain to generate electrical signals, means for synchronously scanning a separate two-dimensional representation of a prominence on said terrain, means for comparing the instantaneous value of a signal derived from said separate representation with the extreme value which said derived signal had previously reached during the same scan, means for generating a control signal corresponding to shadow areas of a prominence when the instantaneous value departs from said extreme value, means for reproducing the electrical signals representative of said terrain, and means for preventing reproduction of said electrical signals at appropriate times by said control signals.

3. Apparatus for generating and reproducing electrical signals representative of a terrain, comprising means for scanning a representation of a terrain to generate electrical signals, means for synchronously scanning a separate representation of a prominence of said terrain, a range filter, means for synchronously scanning said range filter, said range filter being graded to generate a signal inversely proportional to the radius of scan, means for combining the signals resulting from the scanning of said separate representation and said range filter to provide a derived signal, means for comparing the instantaneous value of said derived signal with the extreme value which said derived signal had previously reached during the same scan, means for generating a control signal when the instantaneous value departs from said extreme value, means for reproducing the electrical signals representative of said terrain, and means for preventing reproduction of said electrical signals at appropriate times by said control signals.

4. Apparatus for generating and reproducing electrical signals representative of a terrain, comprising means for scanning a representation of a terrain to generate electrical signals, means for synchronously scanning a separate representation of a prominence of said terrain, a range filter, means for synchronously scanning said range filter, said range filter being graded to generate a signal inversely proportional to the extent of scan, means for combining signals resulting from the scanning of said separate representation and said range filter, a unidirectionally conducting device, a condenser and resistance in series with said device, means for feeding combined signals to said device to compare the instantaneous value of said combined signals with the extreme value which said combined signals had previously reached during the same scan, means for generating a control signal when the instantaneous value departs from said extreme value, means for reproducing the electrical signals representative of said terrain, and means for preventing reproduction of said electrical signals at appropriate times by said control signals.

5. Apparatus for generating and reproducing electrical signals representative of a terrain, comprising a transparency representative of said terrain, a separate transparency representative of a prominence on said terrain, means for synchronously scanning said transparencies with a light spot in a radial manner, a range filter in the form of a transparency, means for synchronously scanning said range filter with a light spot, said range filter being graded radially to pass an amount of light inversely proportional to the radius of scan, a photoelectric cell, means for directing light passing through said separate transparency and said range filter to said photoelectric cell, means for generating control signals dependent on the output from said photoelectric cell, means for reproducing the electrical signals representative of said terrain, and means for preventing reproduction of said electrical signals at appropriate times by said control signal.

6. Apparatus for generating light reproducing electrical signals representative of a terrain, comprising a representation of said terrain in the form of a transparency, a cathode ray tube for generating a light spot, means for radially scanning the beam of said tube to cause said light spot to scan said transparency radially, a separate representation in the form of a transparency of a prominence on said terrain, means for synchronously scanning said separate representation with a light spot, a range filter in the form of a transparency, means for synchronously scanning said range filter with a light spot, said range filter being graded to pass an amount of light inversely proportional to the radius of scan, a photoelectric cell, means for directing light passing through said separate representation and said range filter to said photoelectric cell, a unidirectionally conducting device, a condenser and resistance in series with said device, means for feeding the output of said photoelectric cell to said device to compare the instantaneous value of the output of said cell with the extreme value which said output had previously reached during the same scan, means for generating a control signal when the instantaneous value departs from said extreme value, means for reproducing the electrical signals representative of said terrain, and means for preventing reproduction of said electrical signals at appropriate times by said control signals.

References Cited in the file of this patent

UNITED STATES PATENTS

| | | |
|---|---|---|
| 2,073,370 | Goldsmith | Mar. 9, 1937 |
| 2,164,297 | Bedford | June 27, 1939 |
| 2,240,420 | Schnitzer | Apr. 29, 1941 |
| 2,522,528 | McNally | Sept. 19, 1950 |
| 2,539,498 | Waller | Jan. 30, 1951 |
| 2,562,987 | Laws | Aug. 7, 1951 |